(12) United States Patent
Ramani

(10) Patent No.: US 11,588,840 B2
(45) Date of Patent: Feb. 21, 2023

(54) AUTOMATED ENCRYPTION DEGRADATION DETECTION, REPORTING AND REMEDIATION

(71) Applicant: salesforce.com, inc., San Francisco, CA (US)

(72) Inventor: Ramesh Ramani, Sunnyvale, CA (US)

(73) Assignee: SALESFORCE, INC., San Francisco, CA (US)

( * ) Notice: Subject to any disclaimer, the term of this patent is extended or adjusted under 35 U.S.C. 154(b) by 133 days.

(21) Appl. No.: 16/778,325

(22) Filed: Jan. 31, 2020

(65) Prior Publication Data

US 2021/0243209 A1 Aug. 5, 2021

(51) Int. Cl.
   *G06F 21/00* (2013.01)
   *H04L 9/40* (2022.01)

(52) U.S. Cl.
   CPC ...... *H04L 63/1425* (2013.01); *H04L 63/0209* (2013.01); *H04L 63/105* (2013.01); *H04L 63/126* (2013.01); *H04L 63/205* (2013.01)

(58) Field of Classification Search
   CPC . H04L 63/1425; H04L 63/105; H04L 63/126; H04L 63/0209; H04L 63/205
   See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |

(Continued)

OTHER PUBLICATIONS

"Google Plus Users", Google+Ripples; Oct. 31, 2011; 3 pages.

*Primary Examiner* — Trong H Nguyen
*Assistant Examiner* — Michael M Lee
(74) *Attorney, Agent, or Firm* — Schwabe Williamson & Wyatt

(57) ABSTRACT

Communication security is an ongoing problem. Over time, various protocols have been used and then replaced due to insufficient protection. For example, some client/server web communication used to rely on Secure Socket Layers (SSL) to protect communication, but was replaced with a more secure Transport Layer Security (TLS) protocol. TLS itself has undergone several revisions, and TLS 1.0 is now considered not secure. TLS and other protocols provide backwards compatibility, so while a higher security level is desired, communication may fallback to an undesirable level, e.g., TLS 1.0, if required by either communication endpoint. An intermediary to communication with an organization may capture data to facilitate analyzing it to determine what caused a fallback, and to decide if and how to remediate it. Remediation may vary depending on, for example, whether the cause was from within the organization, or external, such as from a client.

20 Claims, 7 Drawing Sheets

(56) References Cited

U.S. PATENT DOCUMENTS

| | | |
|---|---|---|
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0240205 A1* | 10/2007 | Holtmanns ......... H04W 12/033 726/5 |
| 2008/0249972 A1 | 10/2008 | Dillon |

(56) References Cited

U.S. PATENT DOCUMENTS

| | | |
|---|---|---|
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0030839 A1* | 2/2010 | Ceragioli ............ H04L 67/1036 709/201 |
| 2011/0218958 A1 | 9/2011 | Warshavsky |
| 2011/0247051 A1 | 10/2011 | Bulumulla |
| 2011/0314546 A1* | 12/2011 | Aziz .................. H04L 63/1425 726/24 |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0227272 A1* | 8/2013 | Cox ....................... H04L 63/205 713/151 |
| 2013/0247216 A1 | 9/2013 | Cinarkaya |
| 2014/0359537 A1 | 12/2014 | Jackobson et al. |
| 2015/0128205 A1* | 5/2015 | Mahaffey .............. H04L 63/105 726/1 |
| 2016/0191549 A1* | 6/2016 | Nguyen .............. H04L 63/1425 726/23 |
| 2016/0261621 A1* | 9/2016 | Srivastava .......... H04L 63/1425 |
| 2017/0346853 A1* | 11/2017 | Wyatt ................... H04L 9/3265 |
| 2019/0089736 A1* | 3/2019 | Mehta ..................... H04L 67/02 |
| 2020/0159926 A1* | 5/2020 | Lorch ..................... G06F 21/552 |
| 2020/0220875 A1* | 7/2020 | Harguindeguy .... H04L 63/0281 |
| 2021/0067519 A1* | 3/2021 | Kurian ................ H04L 63/0227 |
| 2021/0092141 A1* | 3/2021 | Gamble ............. H04L 63/1416 |

* cited by examiner

AUTOMATED ENCRYPTION DEGRADATION DETECTION, REPORTING AND REMEDIATION

TECHNICAL FIELD

The present invention relates generally to computing systems, and more particularly to using a messaging service to help identify a source of a degraded security protocol selection.

BACKGROUND

A large-scale cloud-based computer system may include multiple datacenters at various geographic locations to maintain millions of sets of application data for millions of organizations as well as provide millions of sets of application services such as those for customer relationship management, secured data access, online transaction processing, mobile apps, etc., to respective users and/or customers of these organizations. As datacenters grow, evolve and interconnect over time, and as computing resource needs for the organizations evolve over time, networks interconnecting devices continue to grow ever larger and more complex. In current network environments there may be many thousands of interconnected devices, such as client devices, servers, hubs, firewalls, switches, routers, etc.

An organization may have many different entities reachable over a network, such as private intranets, or public networks such as the Internet. The organization may contain many different hardware and software entities, such as data centers, servers, clients, mobile devices, Internet of Things (IoT) machines, etc. Accessing a network may be managed by firewalls that protect the network and its associated hardware/software entities. Firewalls may be positioned at network edges (or perimeters) to separate resources internal to the network from external entities/sources. Because malicious actors relentlessly attack networks, it is important to restrict access to organization entities and their associated resources, and to enforce security policies, such as use of strong cryptographic protocols. Communication with the organization may be monitored and firewalls used to restrict passage of data as needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
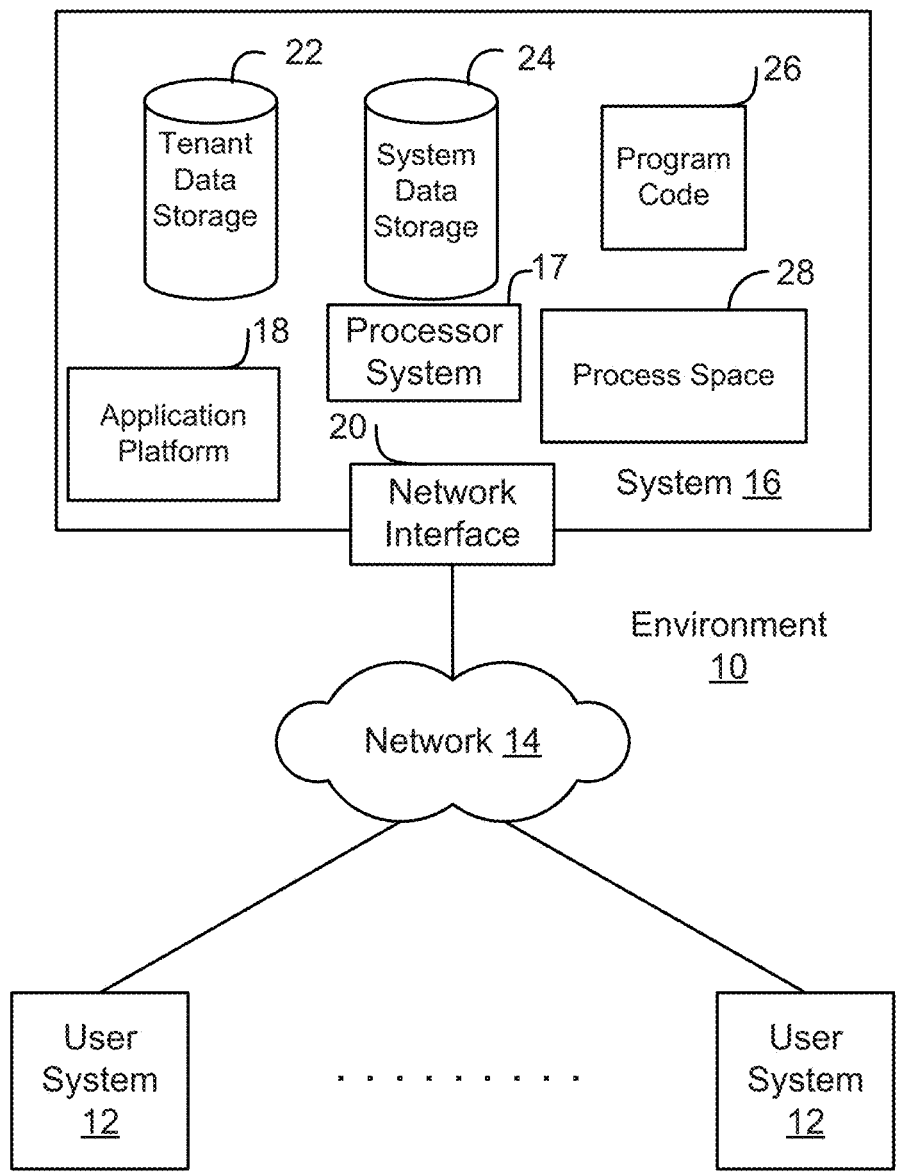
FIG. 1A shows a block diagram of an example environment in which an on-demand database service can be used according to some implementations.

The following detailed description discusses multiple exemplary embodiments for more efficiently managing devices, such as firewalls used to protect an organization. It will be appreciated while various alternatives are disclosed, they are approaches that may be pursued, but none are approaches that necessarily must be used. In addition, while issues with solutions may be identified with respect to one or more exemplary approaches described herein, none should be assumed to have been recognized in any prior art on the basis of being identified as a known issue. In this description, for the purposes of explanation, numerous specific details are set forth in order to provide a thorough understanding of the present invention. It will be apparent, however, the present invention may be practiced without these specific details. In other instances, well-known structures and devices are not described in exhaustive detail, in order to avoid unnecessarily occluding, obscuring, or obfuscating the present invention.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

The following is a brief overview of selected features of various embodiments. This overview is not an extensive summary of the invention or claimed embodiments, is not intended to identify particularly significant aspects of disclosed embodiments, and does not delineate any particular scope of the invention. This overview merely presents some concepts that may facilitate, in a condensed and simplified format, understanding more detailed description below and appreciate the breadth of the claimed embodiments.

FIG. 1 below discuss a complex cloud-based system with many different entities, e.g., servers, clients, databases, firewalls, other machines, etc. At any given moment there may be many different computing devices, e.g., portable computers (laptops, tables, phones, any small and/or portable form factor device, etc.), server computers, client computers, etc. The phrase "client computers" may refer to the same kinds of devices, machines, software, etc. as meant when using the phrase "server computers." With respect to client/server engagements, the term "client" represents a matter of perspective; if a first organization is using the services of a second organization, the first organization may be considered the "client" of the second organization, and the second organization considered the "server" of the services, even if the first organization itself is a server providing services to another organization.

To securely communicate, computing devices use various secure communication techniques, e.g., encryption, to minimize interference with data transfers, transactions, communication, etc. Interference may come from both intentional and unintentional sources. The phrase "computing devices" generally represents any combination of hardware or software that may send and/or receive data and/or communication units, e.g., data packets or other information unit). Computing devices, hardware examples, software possibilities, and encryption will be discussed in more detail below. Briefly, however, one well known and often used encryption technique to protect online (e.g., network and/or Internet) based communication, is the Transport Layer (TLS) protocol, a protocol that replaced the previously prevalent Secure Sockets Layer (SSL) communication. TLS is a proposed Internet Engineering Task Force (IETF) standard, see, e.g., Request For Comments (RFC) 8446, which at the writing of this document, is available at Internet Uniform Resource Locator (URL) tools:ietf.org/html/rfc8446 (to prevent inadvertent hyperlinks, "." in the preceding URL were replaced with ":"). TLS is frequently used to protect data communicated between a website, e.g., a server providing access to data accessible over the Internet (or the "World Wide Web"). TLS enables session-based secure communication by generating session unique encryption keys per communication session (during a TLS "handshake"). The protocol also allows communication endpoints (e.g., the client and the server) to authenticate each other through use of cryptographic techniques such as public key cryptography (PKC), PKI and/or identity certificates, typically a requirement placed servers so a client may verify the server is actually the intended entity being contacted. For example, a Central Authority (CA) may issue a certificate that a server may present to a client to enable the client to validate the server identity. A CA operates in a manner similar to a certificate authority in the public key infrastructure (PKI). Since PKI, PKC and certificates are well understood, they will not be discussed further herein.

Generally speaking, cryptographic security is only as good as the infeasibility of reverse-engineering the encryption used to protect communication. As computing hardware continues to get faster, and malicious entities innovate new ways to undermine cryptographic security, protocols are improved to stay ahead of attacks, as well as to correct insecurities in the protocol. Thus, for example, TLS started with version 1.0, and over time was improved and RFC8446 concerns TLS 1.3. However, it is understood some computing devices (hardware or software) may not yet support the latest security version. Thus, while the latest TLS may be version 1.3, the TLS protocol supports falling back to earlier versions of the protocol. While this may facilitate keeping programs and services functional, use of an earlier protocol may introduce risk of a communication being compromised by using the earlier protocol version.

FIG. 1A shows a block diagram of an example of an environment 10 in which a cryptographic protocol, such as Transport Layer Security (TLS), may be used to protect communication between elements of this embodiment. A portion of the communication may be analyzed to determine, for example, if the protocol has fallen back to an insecure version, a context for the fallback, and remediation steps to take, if any. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. Please note that as used herein the "(s)" suffix on a word or phrase is simply used as a shorthand reference to indicate there may be one or more of the word or phrase; if the word or phrase is treated as a plural in this description or claims that follow, it is assumed one will make appropriate grammatical changes as needed to accommodate the plurality. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. It will be appreciated portions of the FIGS. 2-6 embodiments may be practiced within or in communication with network 14, e.g., some or all of the FIG. 5 network(s) 518 may be part of network 14, or mobile devices 526, 528 may communicate through network 14.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead. It will be appreciated portions of the FIGS. 2-6 embodiments may be practiced in conjunction with the network interface 20, e.g., the network interface may be part of or communicatively coupled with firewalls such as FIG. 5 firewalls 506.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network (See also FIG. 5). The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Javan™ is a trademark of Sun Microsystems, Inc.).

Figure 1B:
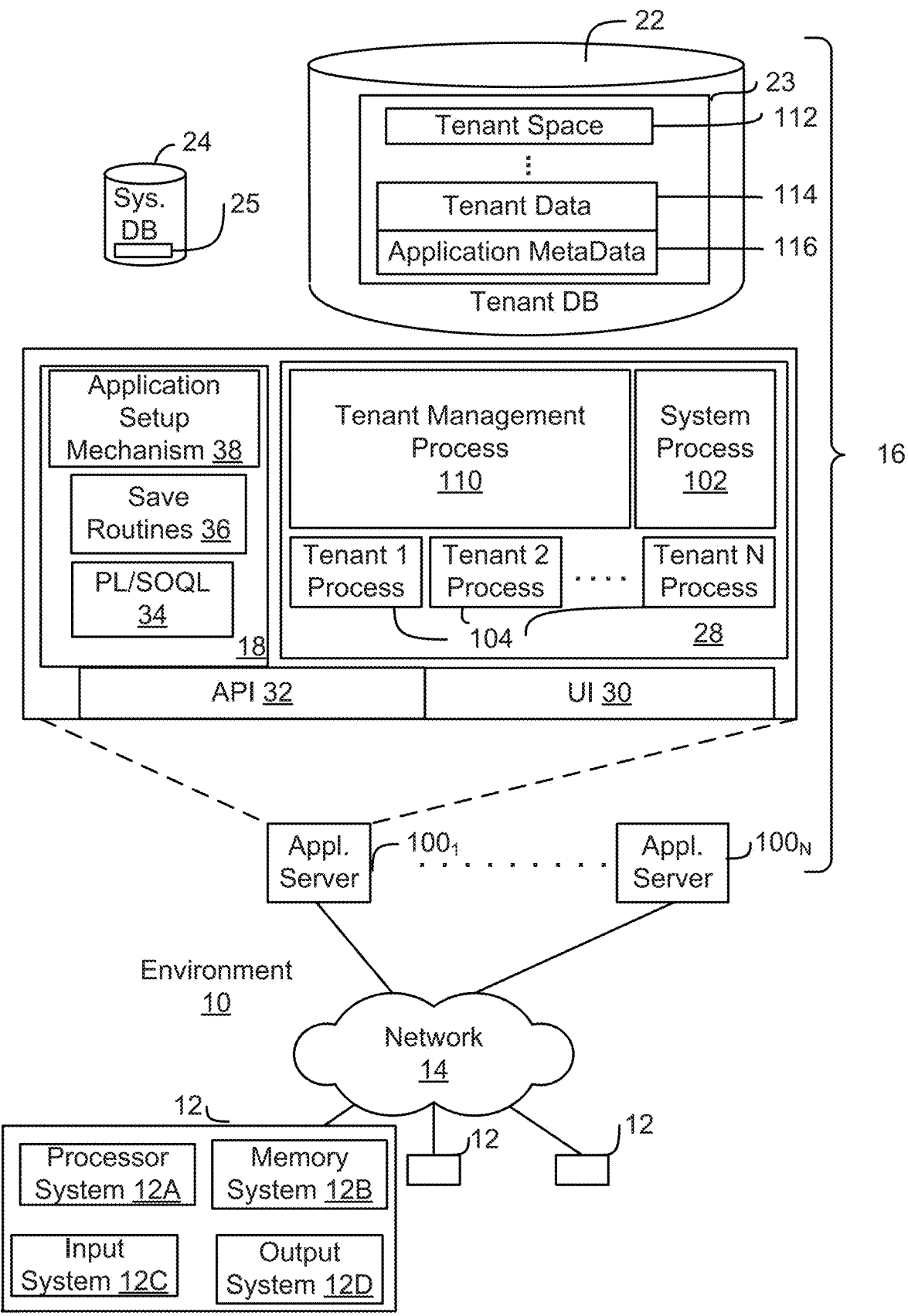
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 1001-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 100₁ can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
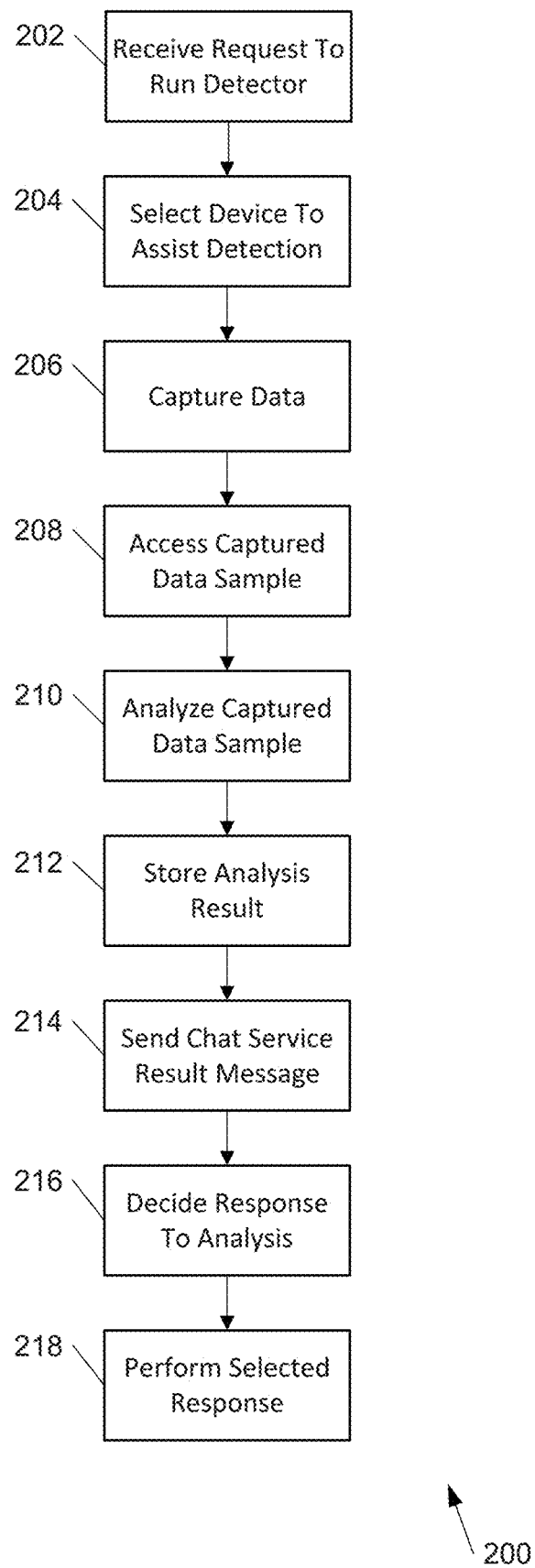
FIG. 2 illustrates an exemplary flowchart, according to one embodiment, for an overview of analyzing a communication session between a source and a destination.

FIG. 2 illustrates an exemplary flowchart 200, according to one embodiment, for an overview of analyzing a communication session between a source and a destination. An organization may provide services, such as may be accessible through a web server, Internet-based service, point of sale system, data storage and/or retrieval, messaging, or any other transaction or communication session. The communication session may occur between a source (e.g., a client, customer, or source of a communication session, etc.) and a destination (e.g., a server, machine, software, service, destination of the communication session, etc.), and may route through or otherwise be monitored by an intermediary.

The source, intermediary, destination and other machines described herein may be any computing device that may interpret and/or execute software to direct the machine to perform operations. The phrase "computing device" generally refers to a source (client) or destination (server), and may include operating under control of an ASIC (application specific integrated circuit), PGA (programmable gate array), FPGA (field PGA), or other fixed and/or programmable circuitry, and includes a virtual computing device, virtual machines, as well as general purpose machines (e.g., a laptop, server, or other machine with a processor and storage, etc.). To assist with a communication session between a source and destination, a session may be secured to help prevent fraud (endpoint identity misappropriation, end-point spoofing, etc.), theft, transmission error, malicious pranks or other acts, or other issues. The communication session may be secured through one or more cryptographic techniques. It will be appreciated any cryptographic environment may be used to secure communication, such as sharing a known pre-shared key and/or certificate, entering a username and password, public key cryptography (PKC), International Telecommunications Union (ITU) X.509, public key infrastructure (PKI), etc.

For expository convenience, the following discussion will assume use of the Transport Layer Security (TLS) protocol for securing communication between a source and a destination. It will be appreciated TLS along with other protocols evolve to keep ahead of vulnerabilities, such as the Browser Exploit Against SSL/TLS (BEAST), threats or as other issues or concerns are discovered. However, to help prevent breaking existing systems, protocols typically allow a fallback to earlier protocol versions. When a source attempts to communicate with the destination using TLS, the endpoints engage in a negotiation, or a protocol handshake, to establish cryptographic communication parameters to be used (see also FIG. 3 item 308). TLS 1.0 (an early version of TLS), as an example, has been considered insecure since 2018 in part because attackers may perform a "man in the middle" attack and observe encrypted traffic between endpoints. This risks authenticity and integrity of data sent between the endpoints. Unfortunately, some hardware and software TLS implementations continue to use TLS. 1.0. This is true of both external (e.g., an organization's client or customer), and internal sources.

To address the security risk, in the illustrated embodiment, let's assume a cloud service is hosting an organization's resources. In various embodiments, the source and destination may be communicatively coupled with one or more networks, and/or other communication mediums, and the networks may be public, private and/or a combination of the two. For example, a source may be (or include, if the source is embodied as an aggregation of devices) a node/machine on the Internet (public network), and/or be within an intranet (private network) or other private communication medium. In some embodiments, a "private" network may be defined within another public and/or private network, e.g., it may be defined as a virtual private cloud in association with network resources provided by a cloud service.

Examples of cloud service providers include, by way of example only and not as a limiting example based on differences in cloud services and/or infrastructure, include Amazon Virtual Private Cloud (Amazon VPC), Amazon Elastic Compute Cloud (EC2), Microsoft Azure (e.g., Hybrid cloud), Google Cloud, Alibaba Cloud, IBM's cloud services, Oracle cloud services, etc. It will be appreciated these and other cloud services and cloud infrastructure vendors provide on-demand and configurable shared computing resources allocated from one or more public and/or private cloud environments, and may provide virtual private environments isolated from other environments/customers having their own associated resources. Various hardware and/or software techniques may be used to establish private environments, such as by allocating private address spaces, e.g., Internet Protocol (IP) subnets, providing private virtual communication interfaces, e.g., virtual Local Area Networks (VLANs), virtual private networks (VPNs) to securely control access to virtual private environments.

For simplicity in presentation, we can assume the cloud service is compatible with the well-known Amazon AWS/EC2 services, and the servers and services provided by an organization may be protected by devices that, while not required to be a firewall, are assumed to be operationally compatible with a firewall, such as the Palo Alto Networks® managed firewalls. If an organization becomes aware that communication from a source is using a risky protocol, such as TLS 1.0, or if the organization simply wants to regularly look for such insecure connections, the cloud service provider may receive 202 a request to run a detector. It will be appreciated the detector may be provided by the cloud service, or run by an organization. For example, the detector may operate in a server of a cloud service and run on behalf of a hosted organization, or it may be a software service offered by the cloud service accessible by an organization. It may also be implemented as serverless software instantiated by an organization on, for example, the AWS Lambda Serverless Compute environment, or the like.

After receiving the request, the cloud provider may select 204 an appropriate device to perform the detector, e.g., the detecting operations. For example, if an organization is aware of a possible issue such as TLS 1.0 traffic passing through a certain device, network region, specific firewall, etc., that may determine which device(s) needs to be investigated. Alternatively an organization may simply test all firewalls periodically. It will be appreciated the detector need not be a physical firewall, and instead it may be a computing device running firewall software, or a proxy service receiving and processing data and recognizing TLS 1.0 use, or other intermediary able to monitor communication between a source and a destination. The detector may instruct a selected device to capture 206 (record) data traffic between the source and destination for a period of time, e.g., three minutes. One skilled in the art will recognize the time frame is arbitrary, the purpose is to collect enough data to allow meaningful analysis. The time could be longer or shorter, and results (or lack thereof) may be used as an indicator of need to adjust timing. In another embodiment, characteristics of data flowing past may help to determine when to start or stop data capture. For example, a TLS handshake where a server (destination) is authenticated by its certificate, has known "ClientHello" messaging along with a back and forth of negotiation messages until the server, sends a "Finished" message. The capture may therefore be triggered around the handshake with perhaps a window of data, if desired, buffered and captured to encompass a period before and after the handshaking.

The entity seeking the detection may access 208 the captured data. It will be appreciated the access may be direct or indirect depending on what is capturing the data and who has responsibility for the detector. For example, a firewall (or other intermediary) may perform the detecting. If the firewall belongs to an organization (see, e.g., FIG. 5 item 504 discussion) the organization may have direct access to the data. If the detecting is performed by the cloud service provider, or other entity, e.g., a third party security entity, then the captured data may be stored in the firewall and/or stored in a data store (such as a database) and made available to an organization and/or the cloud service. After accessing the data, the entity seeking the detection may analyze 210 the data. Analysis results will vary depending on what is being investigated (see also FIG. 3). In one embodiment, captured data includes data packets, such as Transmission Control/Internet Protocol (TCP/IP) packets, that may be analyzed to determine source/destination IP address (network address) information, and to determine whether, for example, an undesired protocol or protocol level such as TLS 1.0 is in use and which endpoint to a communication session is responsible for the undesirable security level. The source may be within an organization itself, which may affect analysis response options.

Analysis results may then be stored 212. Results could be stored where the detection occurred, e.g., with a data store associated with a firewall or other device performing the detecting, or it may be retained in a data store associated with an organization and/or a cloud service hosting the organization. A message may be sent 214 with a multi-entity chat service. In some embodiments, a multi-user/team/workspace "chat" system, such as the Slack® environment provided by Slack Technologies, Inc., may be used to convey information, such as by posting one or more messages regarding the data capture and analysis of characteristics of the data. It will be appreciated different entities, e.g., machines, software, and/or people, may monitor a chat session, chat room, or the like, for these security-related messaging and take action thereon. The phrases chat system, chat service, chat session, and the like all refer to having an environment in which messages may be sent with content that may be accessed by one or more entity. Receipt may be based on electing to receive certain messages, e.g., by subscribing to a chat channel so alerts are generated when new messages are posted. It will be appreciated messages may have a known format to facilitate processing received messages. Messages may also be presented in a natural language format and a natural language parser (NLP) or equivalent system may interpret posted messages. In the illustrated embodiment, one operation in response to the sending the message is to review the message and decide 216 on an action to take responsive to the message. The chosen action may then be performed 218.

Figure 3:
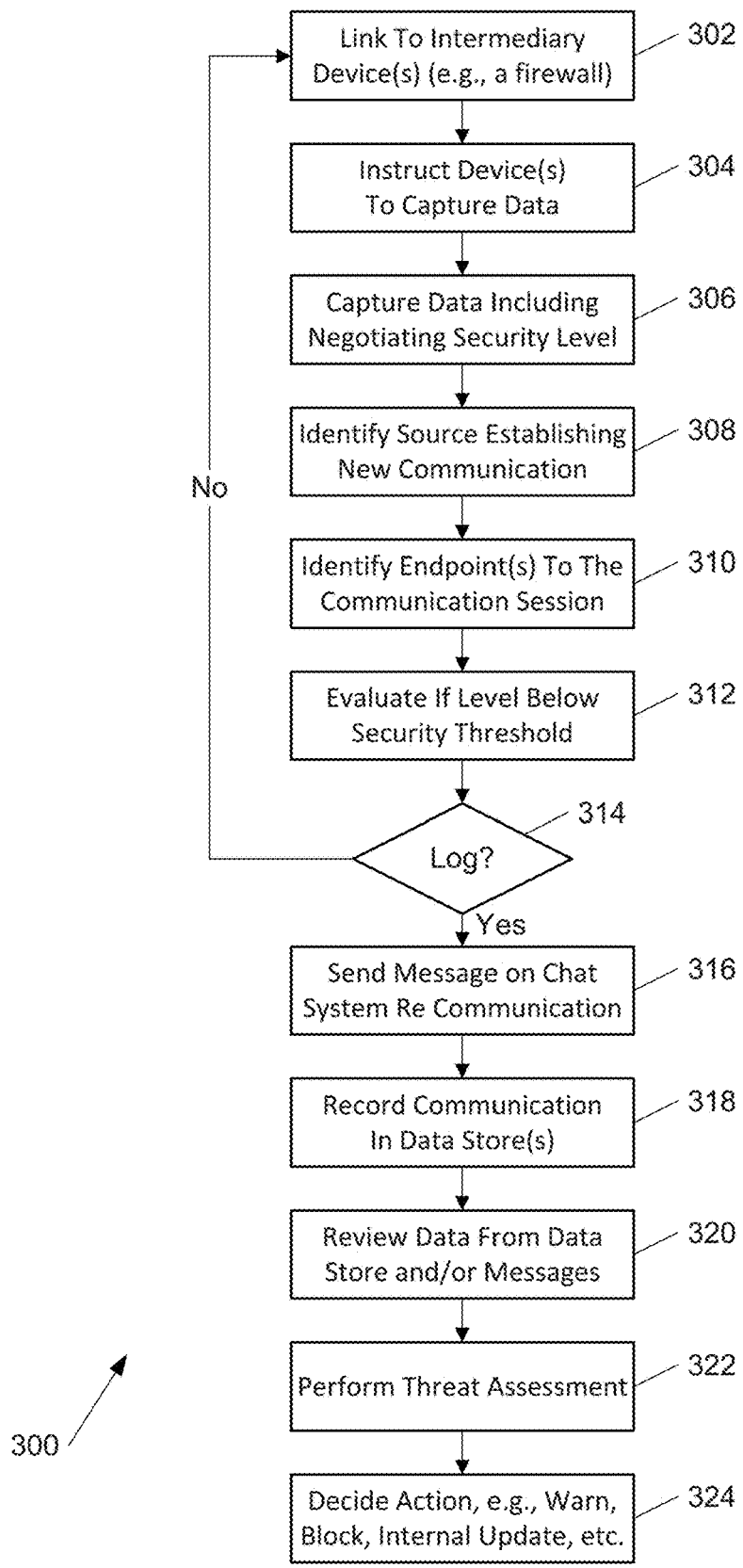
FIG. 3 illustrates an exemplary flowchart, according to one embodiment, for engaging with an intermediary device(s) to inspect communication passing through the device(s).

FIG. 3 illustrates an exemplary flowchart 300, according to one embodiment, for engaging with an intermediary device(s) to inspect communication passing through the device(s). FIG. 3 is a variation on FIG. 2 and hence concerns related issues. In this embodiment, a control program links 302 to an intermediary device. Similar to FIG. 2, the control program may be operated by an organization, by a cloud service on behalf of the organization, by a third party on behalf of an organization, and it may be performed in a server, as serverless software, etc. The control program may periodically engage intermediary devices to monitor various communication sessions. It will be appreciated the term "periodically" may meanings dependent on the circumstances, for example, some organization may check every eight minutes, other environments may look more or less frequently depending on need/concerns.

The intermediary may be any device in a position to monitor data traveling between a source and destination. While it may be assumed the intermediary is a firewall (internal to an organization's network, or an edge firewall), it may also be a proxy, or other device found along a route between a source and a destination. The ability to directly or indirectly see and/or infer communication content is what is important, and hence a monitoring perspective external to a communication datapath is contemplated if the communication content is derivable. If there are multiple intermediaries, they may be investigated sequentially, in parallel, or in some other fashion as desired. If an organization is hosted by a cloud service, the cloud service may be queried for a list of all devices (e.g. firewalls) associated with the organization that satisfies various criteria, e.g., firewalls relating to communication datapaths of interest. An intermediary is instructed 304 to capture data passing between the source and destination. As discussed with respect to FIG. 2 the capturing may be for a specific time period, such as three minutes, or based on characteristics of the data being seen, e.g., event based decisions to start/stop capturing data. Capturing generally refers to copying and at least temporarily storing data traffic associated with the communication. Exemplary events for event based decision making could be monitoring the start/end of a security protocol handshake to establish a communication session.

Data is captured 306, including data relating to negotiating the communication session. During negotiation, a destination may prefer a security level for communication. Unfortunately, negotiation is typically source-driven. Assume a typical web client/web server contact using the TLS protocol. The destination may prefer TLS 1.3, which is currently believed secure. In one embodiment, the source may send a ClientHello message indicating a lower highest-level TLS protocol level it supports, along with other data including data relating to ciphers the source supports. The destination then responds with a ServerHello message indicating a chosen protocol version compatible with the source, along with other data including data relating to the ciphers offered by the source. In another embodiment, however, the source may send the ClientHello message indicating a higest-level TLS protocol it supports, where this level is higher than the protocol supported by the destination, e.g., the destination may request the source to lower its protocol level. Since the negotiation started with an endpoint's, e.g., the source's or destination's highest supported protocol level, one endpoint typically has to fall back with a selection of the best protocol supported by both endpoints, even if it is not secure, e.g., TLS 1.0.

Captured data is processed by a detector service. Depending on how the data is being captured, and the capabilities of the device performing the capturing, the detector service may be implemented in whole or in part by the intermediary, and/or the detector service may be provided by the organization or by another environment or device on behalf of the organization, such as a cloud service hosting the organization. The detector service may inspect captured data packets to identify 308 the source initiating the communication, and as well as to identify 310 one or more endpoint (this may be a multicast communication). The data may be evaluated 312 to determine if the communication session has characteristics suggesting it should be logged for follow-up review and/or action. If 314 logging is not desired, e.g., the communication circumstance does not suggest a threat or issue for follow-up, processing may loop back, for example, to linking 302 to another intermediary to capture 304 data.

If 314 logging is desired, various actions may take place to ensure interested entities (which may be machines, Artificial Intelligence, or people) are aware of the communication. In one embodiment, a message is sent 316 to a chat system, where the chat system is expected to support multi-entity chat so interested entities may subscribe to messages and be notified of the message being sent 316. In addition, the information about captured communication data may be recorded 318 in a data store, such as a database. It will be appreciated the location of the data store may be distributed and/or duplicated among multiple entities.

The data sent 316 in a message(s) or recorded 318 in a data store(s) may be reviewed 320. Multiple entities may perform the reviewing. For example, an automation tool(s) may automatically review recorded 318 data and/or receive and process sent 316 messages. An organization may also have people/teams assigned to receiving, reviewing and responding to sent messages and/or the recorded data. It will be appreciated review may occur immediately or periodically, e.g., according to a schedule. Depending on circumstance and/or characteristics of a the communication, performing 322 an immediate threat assessment may be warranted. Without exigent circumstances, threat assessment may be periodic. Based on the threat assessment, a decision 324 may be made on an appropriate response to take.

It will be appreciated any number of responses may be decided 324 depending on the specific circumstances surrounding the communication. For example, if the destination is not considered related to a critical resource, then the response may be to warn the source that the communication is not meeting security requirements and the source needs to update its software and/or hardware environment(s) as needed to comply with destination security requirements. Alternatively, if the destination contains sensitive and/or protected resources, the appropriate response may be to block some or all communication from the source until the source updates their software and/or hardware environment(s) causing the problem. It will be appreciated some communication may be within an organization, e.g., the organization itself may have outdated software and/or hardware using undesirable protocols. If so, barring exigent circumstances, rather than blocking internal communication, this may instead trigger sending an internal message or other action to report that an internal update is required.

Figure 4:
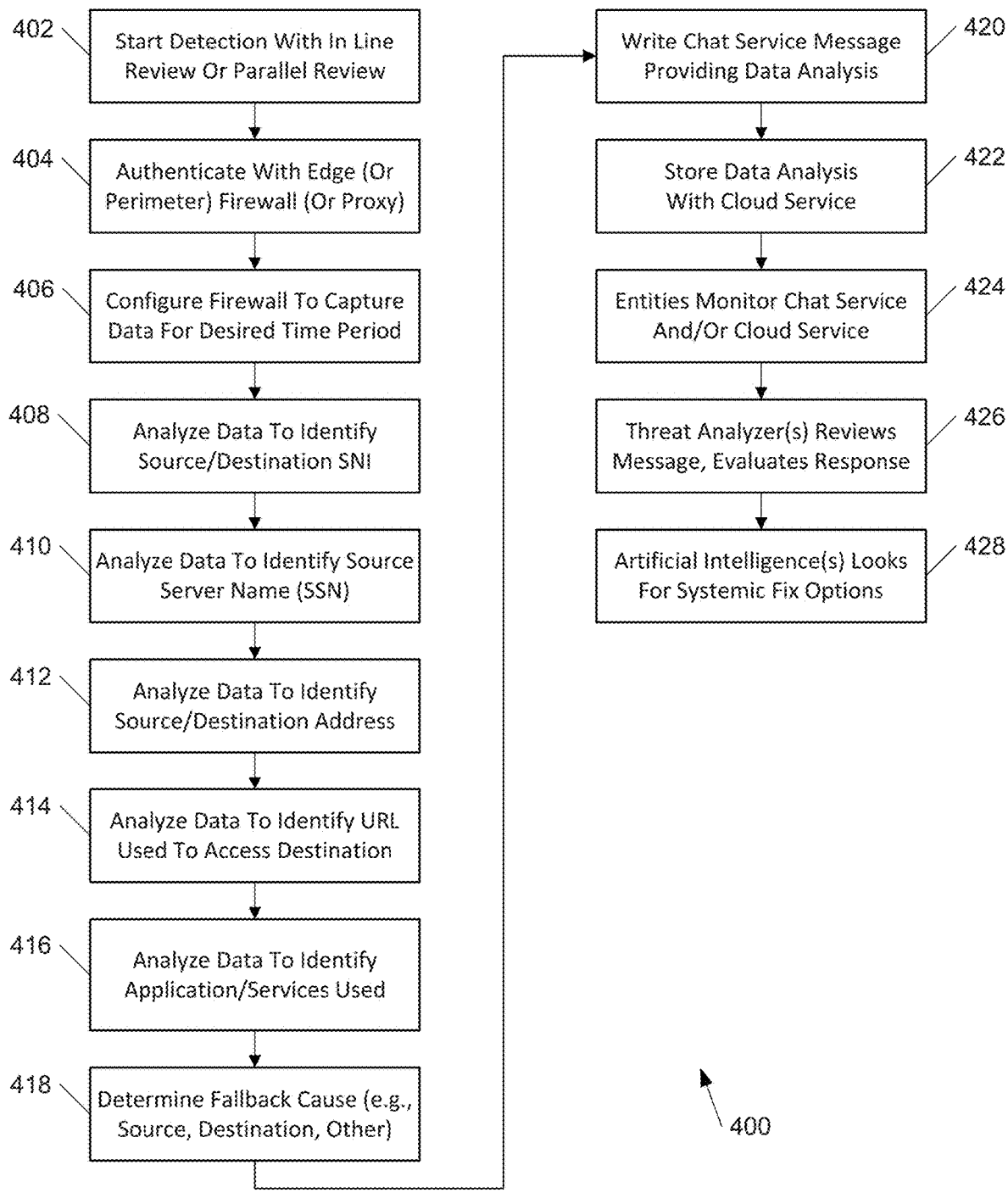
FIG. 4 an exemplary flowchart, according to one embodiment, for multiple entities to cooperatively monitor, evaluate and remediate a communication session.

FIG. 4 an exemplary flowchart 400, according to one embodiment, for multiple entities to cooperatively monitor, evaluate and remediate a communication session. In this embodiment, a detector service starts 402 detecting data. As discussed previously, there may be multiple triggers for the detecting, e.g., performing it periodically on a schedule, responsive to an event that triggers a review, manually, or based on other criteria. In this embodiment, a cloud service hosts an organization and its resources in one or more Virtual Private Cloud (VPC) (see also FIG. 5 discussion), where the cloud service provides one or more edge (or perimeter) firewall to protect access to an organization resource(s).

The cloud service provider is assumed to be using a tool, such as serverless software to implement the detector service on behalf of the organization. When the tool operates, it authenticates 404 with an edge firewall, proxy, or other software and/or hardware computing device that may be communicatively located between a communication source and destination. The firewall is presumed manageable and, after authenticating with the firewall, it may be configured 406 to perform data capture for a desired period of time. In another embodiment, the firewall is instructed when to start, and when to stop the capture. As discussed above, captured data may be analyzed. In the illustrated embodiment, captured data packets may be analyzed 408 to determine Server Name Indication (SNI) data. SNI data is an extension to the TLS protocol in which a source may indicate a hostname for its intended destination (see, e.g., IETF RFC 3546 § 3.1). Since internet addresses are finite, it is useful to share a single network address among multiple servers, such as web servers. Most modern web clients validate a server, with which a communication session is established, by inspecting a certificate presented by the server. The SNI data is important for being able to identify whether the source has reached the correct destination, e.g., is communicating with the correct server. Based on the SNI data the destination can reply with an appropriate certificate for the desired server.

Regarding identifying 408 the source, the above assumes certificate validation of the destination. However, a source may use client authentication, in which the source provides a certificate, or a URL(s) pointing to a certificate(s), however this may break compatibility with TLS 1.0, and while avoiding TLS 1.0 is desirable from a security point of view, operationally it may be preferable to allow a TLS 1.0 connection so that it may be detected and remediated later. Thus it is possible but unlikely a source using TLS 1.0 will directly identify itself to the destination. However, it may still be possible to identify the source from other characteristics discernible about the source, and in effect, form a TLS fingerprint for the source. For example, different sources engage a TLS conversation with different selections of supported TLS protocol levels, specific supported cipher-suites, compression choices, protocol extensions, etc. The combination of these attributes from the TLS handshake may help identify the source.

In one embodiment, in addition to identifying the SNI, if the organization is hosted by a cloud service, the detector service may query the cloud service, e.g., via Amazon Web Service (AWS) Application Programming Interface (API) calls, or equivalent, to obtain 410 the Source Server Name (SSN), or fully qualified domain name (FQDN) for the destination. In one embodiment, the cloud service may associated the SSN with the destination, such as by assigning a "tag" to or otherwise associating the tag with the destination. In another embodiment, the SSN may be determined for the source. In a further embodiment, depending on need, interest, application structure, or other consideration, it will be appreciated the SSN may be determined for both the source and the destination. An API may specify data input/output requirements and/or formats for processes, functions, routines, data structures, objects, object classes, variables, processing hooks, call-back functions, etc, as well as be used to retrieve information and/or machines associated with a tag. The API may be publicly known, and documented, such as for AWS, TLS, and Web APIs to interface web communication endpoints. Well-known APIs include REpresentational State Transfer (REST) APIs, often used as they are robust, stateless, uniform layered, and extendable (code on demand).

It will be appreciated the entities (clients, servers, cloud services, chat systems, chat services, VPCs, computing devices, etc.) discussed herein may be abstracted and represented as REST resources that may be manipulated as disclosed herein. Additionally, private APIs may be used when, for example, the communication ecosystem is well known and/or controlled, thus allowing private APIs that afford security and/or efficiencies possibly unavailable to a public and/or well-known API. In addition, APIs may enable a tool to support arbitrary operations, such as a firewall tracking applications passing through it. An API may have an extensible interface to support future features of devices and/or software, and may provide one function/API call that is aggregating multiple requests and/or device functions, or aggregating functionality of multiple devices, e.g., presenting a virtual device built on features provided by one or more other devices.

In addition to identifying 408 SNI and 410 SSN information, the captured data may be inspected to identify 412 source and destination network addresses, e.g., IP addresses. While the SNI may be enough to identify a destination, it is nonetheless helpful to identify IP addresses associated with a communication session. The source address may specifically identify a client, it may indicate the address of a gateway (e.g., a router, firewall, proxy, etc.) for a network through which the client, at least in part, may use to communicate with the destination, or it may identify a server or service that is making calls to a destination URL. That is, the captured data may also be analyzed to identify 414 what URL was used to access the destination. In one embodiment, details of a server and/or service utilizing the URL may be determined by querying a cloud service, e.g., by way of an API or equivalent, as discussed above with respect to item 410. The URL may be used to narrow down the particular destination as well as what service of the destination was being accessed. It will be appreciated different services may have different minimum security requirements, or no requirement for non-sensitive data. In some embodiments, sources may be given a specific access URL to a destination service and if so that may also be used to identify which source or service operating in the source is engaging in the communication with the destination. The more information captured and stored, the more likely we can properly identify endpoints to a communication session and remediate problematic communication.

In addition, captured data may be analyzed to identify 416 applications and/or services used in the communication between the source and the destination. For example, various services are provided using "well known" communication ports, e.g., web pages on port 80, SSH connections on port 22, etc. See, Internet URL iana:org for a comprehensive list of port /protocol/service usage (to prevent inadvertent URLs in this document the "." in the preceding URL was replaced with a ":"). Further, depending on the firewall used by an organization, the firewall may also have information regarding applications traversing the firewall. For example, some Palo Alto Networks firewall support an "App-ID" (application ID) which may be used to identify applications independent of port, protocol or encryption in use. In effect the firewall monitors and classifies traffic to identify "parent" applications, embedded/tunneled "child" applications within the parent applications, and other traversing data.

With the identified 408-416 information from the captured data, if the negotiated security protocol is insufficient (e.g., TLS 1.0) the identified information may be analyzed by the detector service to determine 418 the cause of the selected security protocol falling back to an insufficient level. Thus, if for example a communication session is using TLS 1.0, and that connection was not initiated by the destination, but rather it resulted from a downgrade by the source, e.g., a customer, the data concerning the source, such as the customer SNI, as well as other analysis results, could be written 420 to a chat service in a chat message that captures the TLS problem. It will be appreciated while a chat service is illustrated here and elsewhere in other illustrated embodiments, any environment providing for alerts and reviewing alerts may be used. In one embodiment, the downgrade may be initiated by the destination, in which the source must then comply; regardless of which endpoint initiates the downgrade, information regarding the downgrade and other communication data may be written to the chat service. In addition, the data concerning the downgraded communication session stored 422 (or posted) into a data store associated with the cloud service (e.g., saved to a database, posted to an AWS S3 bucket, etc.). As noted above, various entities may monitor 424 the chat service for security related messages that may be written 420 or access stored data 422 and process the content.

For example, a threat analyzer(s) may review written 420 chat messages and based on the source, destination, apparent protocol or application or service involved, the threat analyzer(s) may select a remediation action (see also, e.g., FIG. 3 item 324 discussion above). In addition, there may be Artificial Intelligence (AI) employed by the detector service to take a systemic view of this and other communication to evaluate possible remediation options, including recommending the organization establish or call on a team to review this and other (if relevant) communication so that the source and/or destination may be notified of the issue and prompted to revise their environments. In some embodiments, a time frame may be required and if corrective action does not occur then the firewall could be configured with a rule to block the communication, thus forcing a change by either the source or destination as required. Blocking may be temporary or permanent. It will be appreciated warnings may be preferred over blocking if the origin of a downgraded protocol is internal, e.g., downgraded by internal destination, or when if communication is between two internal organization endpoints.

Figure 5:
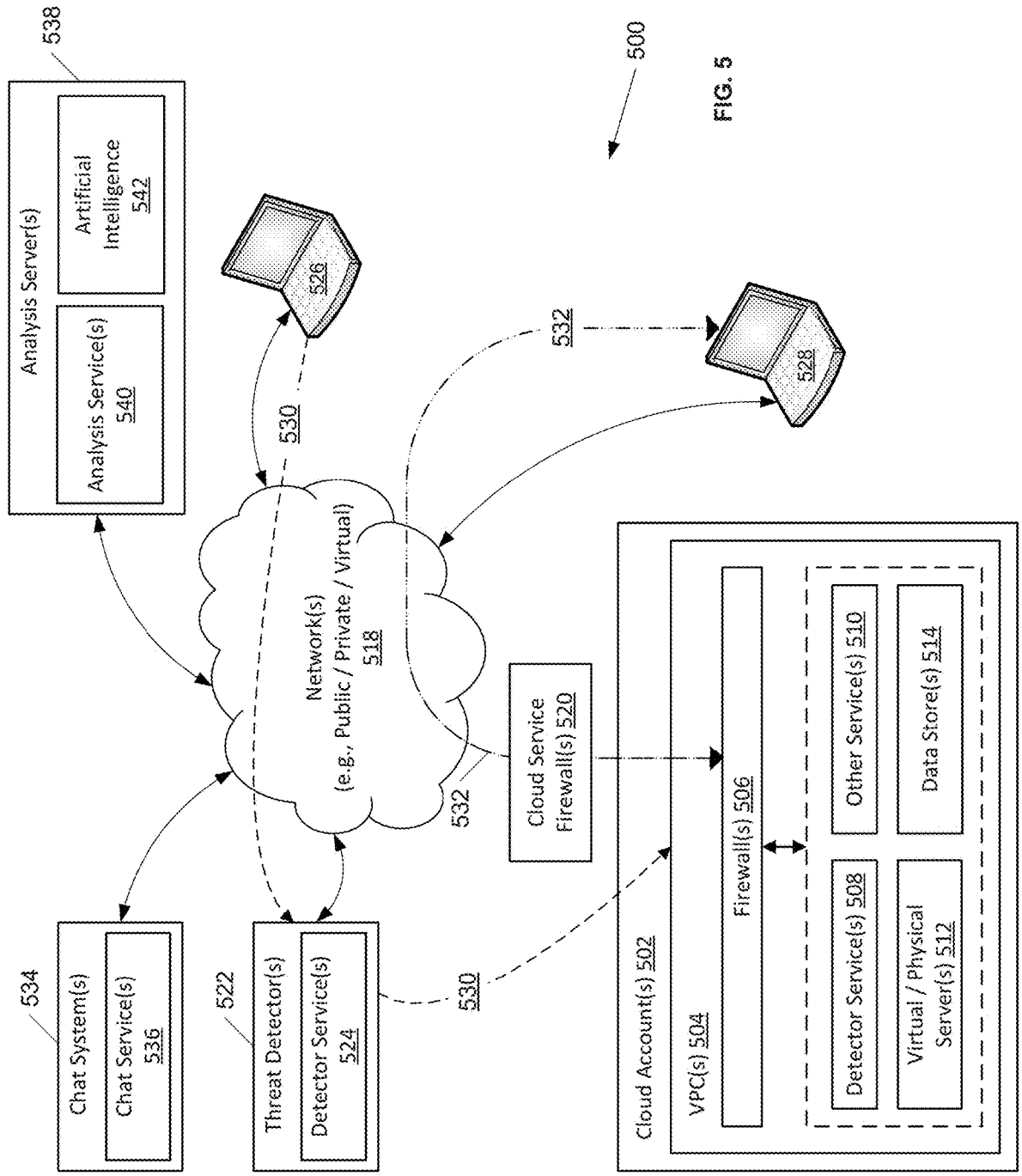
FIG. 5 illustrates a system according to one embodiment that may be used to perform the variously disclosed remediation of communication between a source and a destination.

FIG. 5 illustrates a system 500 according to one embodiment that may be used to perform the variously disclosed (see, e.g., FIGS. 2-4 discussion) remediation of communication between a source and a destination. As discussed above, in various embodiments, there may be one or more machine or computing device, that may be operating under direction of hardware and/or software (or their equivalent) to provide a detector service that may trigger and/or perform a capture of a communication between a source and destination. Various devices may inter-communicate using communication interfaces, ports, or the like, and communication may be encapsulated with an Application Programming Interface (API) to facilitate coordinated processing.

In the illustrated embodiment, an organization is hosted by a cloud service, and illustrated are one or more cloud account 502 which may be associated with a cloud service(s). For convenience we assume the cloud service(s) is Amazon Web Service (AWS) compatible, and providing Amazon Elastic Compute Cloud (EC2) environments and other service. Shown are one or more Virtual Private Cloud (VPC) 504 associated the cloud account(s). Each VPC may have one or more associated firewalls(s) 506, and it is assumed a VPC represents a private environment that appears from external perspective to be a conventional computing environment. As with any computing environment, the firewall(s) protects access to organization resources, such as services 508, 510 (which may be serverless software), virtual and/or physical server(s) 512, data store(s) 514 (e.g., databases or other state preserving mediums), etc. It will be appreciated the services may be any service an organization may want to provide internally or externally to customers or other entities, such as web based services, or they may be private services such as providing detector service 508.

It will be appreciated while the illustrated operations reference a firewall(s) 506, disclosed techniques are applicable to any device(s) that operate like a firewall that can inspect information traveling through or otherwise detected by the device. Actions may be taken relating to inspected information. In various embodiments, it will be appreciated the device may be communicatively coupled with one or more network(s) 518, and/or other communication mediums, and the networks may be public, private and/or a combination of the two. In some embodiments, the VPC utilizes Palo Alto Networks (PAN) Firewalls (FWs) or equivalent type devices as security devices to protecting access to restricted or otherwise private resources. In some embodiments, the Amazon Web Services (AWS) platform may be used to implement a private environment shielded by the PAN firewalls where the firewall is able to validate entities seeking access to protected resources, as well as able to respond to requests to capture data traffic passing through the firewall. It will be appreciated a firewall(s) has interfaces, communication ports, or the like facing both inward toward machines internal to a private environment, e.g., within the VPC and a private network if any, as well as facing external, such as to receive connections from the Internet.

Although the VPC(s) 504 is shown as protected by a firewall(s) 506 in some embodiments, there may be a firewall 520 external to the VPC(s) provided by the cloud service that is separate from firewalls associated the VPC(s). The firewall may cooperatively operate with the VPC(s) firewall(s) 506 or it may operate independently, processing data passing to the VPC. In one embodiment, although the VPC(s) is shown with a detector service(s) 508, as discussed above a third party threat detector(s) 522 may provide a detector service 524 that may be used as disclosed herein to monitor traffic from a source, e.g., a computing device 526, 528 through the network(s) 518, to the VPC(s). If the source is computing device 526, it may reach the destination by passing through the threat detector(s) 522 which may provide the detector service if it is a physical or logical intermediary on a datapath 530 between the source and destination and hence able to monitor or capture communication session data.

Alternatively, or in addition to the threat detector 522, if the source is computing device 528, it may communicate with the destination over, for example, datapath 532 where communication to the hosted organization passes through a firewall(s) 520 provided by the cloud service hosting the organization, and at least this firewall(s) may operate as disclosed herein to facilitate monitoring and capturing data between the source and destination for analysis. Although the source 526, 528, is illustrated as a mobile computing device, such as a laptop computer, it will be appreciated the source may be any computing device or collection of devices capable of communicating with a destination, e.g., the VPC(s) 504. In one embodiment, depending on how a service is implemented in the VPC(s), a VPC (which one skilled in the art will appreciate may appear to an external entity to be a data center) may be a source and the illustrated source 526, 528 may be a destination of communication from the VPC. Thus, for example, in the context of FIG. 2, a source (computing device 526, 528) may initiate contact to a destination (VPC(s) 504), which may trigger the request 202 to run a detector (e.g., one or more of the detectors 508, 522) where communication data is captured 206, and analyzed 210.

Also illustrated are a chat system(s) 534 that may provide a chat service(s) 536, that may be used as discussed in various embodiments (see, e.g., FIGS. 1-4 items 214, 316, 418 discussion), where messages posted to a chat service, such as a multi-entity chat group, may be received by interested entities/interested parties, and processed. For example, there may be an analysis server(s) 538 that provides one or more analysis service(s) 540 that waits for posted messages, and may analyze them (see, e.g., FIG. 4 items 408-416 discussion) to determine if there are systemic issues to be addressed, e.g., to monitor not just individual connections between a source and a destination, but to also look for other security implications. In addition, the analysis server(s) may also take a systemic look to see whether internal resources may be reconfigured to cover for a particular internal service that may be failing the security requirements. For example, if one server is below a security threshold but another is not, then firewalls, routers, etc. may be reconfigured to route traffic through the successful service and a warning sent to have the failing service updated or replaced. It will be appreciated the analysis server(s) 538 (as well as other various entities, such as the VPC(s) 504, the threat detector(s) 508, 522, and other disclosed entities discussed herein) may use artificial intelligence 542 to perform operations to facilitate adaptive and dynamic responses to potential threats.

Figure 6:
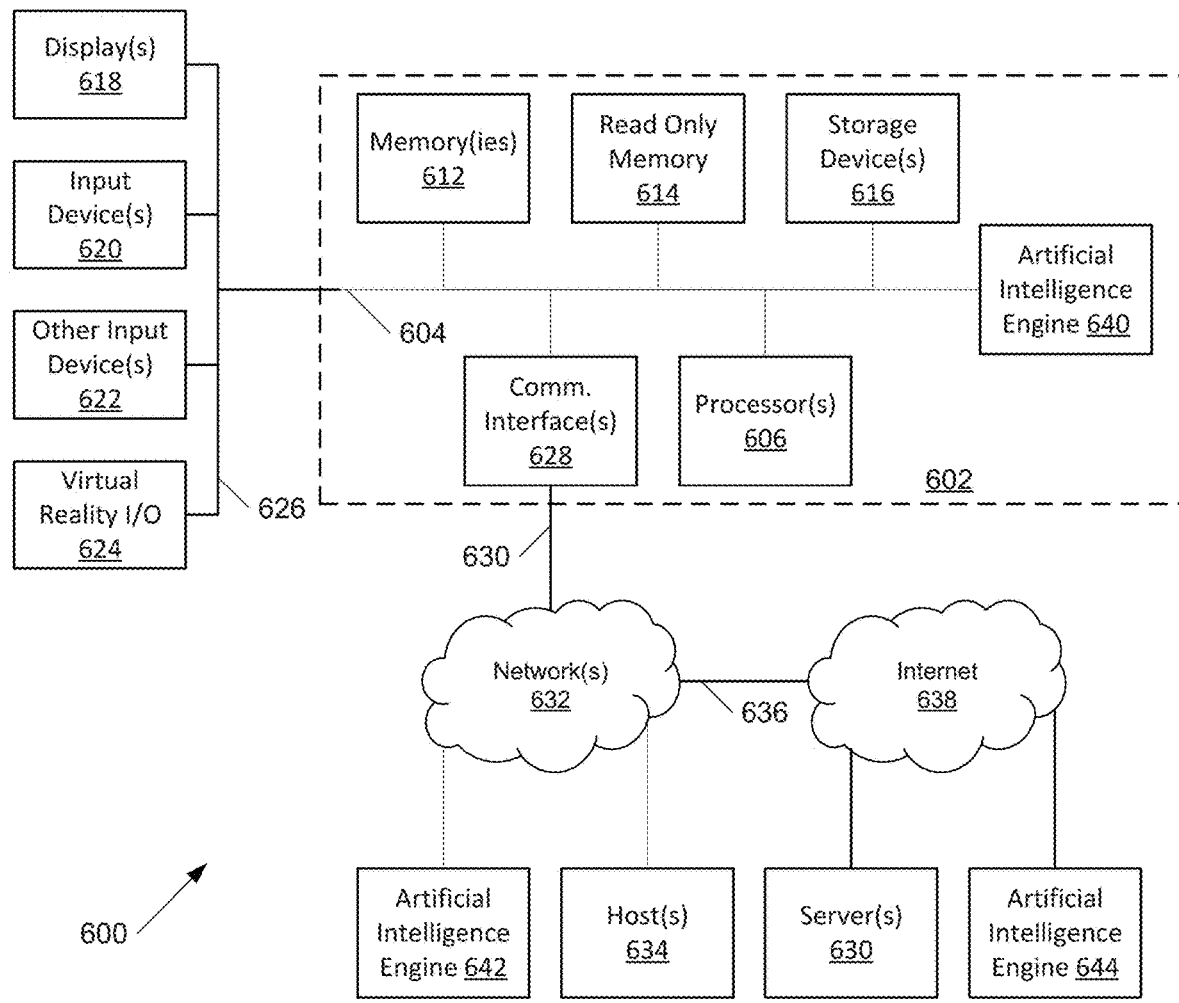
FIG. 6 illustrates an exemplary hardware environment according to one embodiment.

FIG. 6 illustrates an exemplary hardware environment according to one embodiment. It will be appreciated the environment 600 may share features and characteristics discussed with respect to elements of FIG. 1. Disclosed above are procedures, systems, methods, processes, and the like that may be implemented by one or more general purpose or specific purpose computing devices, such as FIG. 5 items 504, 520, 522, 526, 528, 534, 538. Specific purpose computing devices may be hard-wired to perform the techniques, or may include digital electronic devices and operate in whole or in part under control of an application specific integrated circuit (ASIC), programmable gate array (PGA), field PGA (FPGA), or other fixed and/or programmable circuitry that may be persistently programmed to perform aspects of disclosed embodiments. General purpose and specific purpose devices may include program instructions in firmware, memory, or other storage, or a combination where if the instructions are executed by a processor implement aspects of the disclosed embodiments.

Specific purpose devices include by way of example only and not intended to be a limitation, desktop computer systems, portable computer systems, handheld devices, networking devices, telephones, tablets, transportation devices, or any other device that incorporates hard-wired and/or program logic to implement disclosed embodiments. General purpose devices, include by way of example only and not intended to be a limitation, a laptop (see, e.g., FIG. 5 items 526, 528) or other machine that may execute an operating system and/or software to program to program functionality of the device. For example, illustrated is a computer system 602 upon which embodiments or portions of embodiments of the invention may be implemented. The computer system includes a bus 604 or other mechanism for communicating information within the computer system, and one or more processor(s) 606 coupled with the bus for processing information. The processor(s) may be, for example, a general purpose microprocessor, a custom processor, or other processor or collection of processors. It will be appreciated multiple processors may operate collectively as if as a single processor. Although the processor(s) are shown as all within the computer system, there may be other processors accessible over another bus (not shown), such as by way of an attached external enclosure containing processors. Additionally, information execution may be distributed across multiple processors accessible over one or more network(s) 608, e.g., internal networks within an environment including the computer system, and/or over the Internet 610.

The computer system 602 also includes a memory 612, e.g., a main memory, such as a random access memory (RAM) or other dynamic storage device, coupled to the bus 604 for storing information and instructions to be executed by the processor(s) 606. The main memory may also be used for storing temporary variables or other intermediate information during execution of instructions to be executed by the processor(s). Such instructions, when stored in non-transitory storage media accessible to the processor(s), render the computer system into a special-purpose machine that is device-specific to perform the operations specified in the instructions. The computer system may further include a read only memory (ROM) 614 or other static or non-volatile storage device coupled to the bus 604 for storing information or instructions for the processor(s). A storage device or devices 616, such as a magnetic disk, optical disk, or other storage media may be provided and coupled to the bus for storing information and instructions.

The computer system 602 may be coupled via the bus 604 to one or more output device(s), e.g., display(s) 618, such as a liquid crystal display (LCD), for displaying information to a computer user. A display may also include devices, such as Braille output devices, or other devices intended to facilitate presenting information to users that may benefit from sensory accommodation, such tactical and/or altered visual output for sight-impaired users. There may also be input devices 620, including alphanumeric and/or other keys, coupled to the bus for communicating information and command selections to the processor(s) 606. There may be other input devices 622, such as a mouse/tablet/trackball/cursor direction keys/Braille device, or other sensors including biometric devices to translate biometric information into input, for communicating direction information and command selections to the processor(s), and which may control, for example, cursor movement on the display(s). There may also be Virtual Reality Input/Output (I/O) 624 devices that may be used in addition to or in lieu of the other devices 618-622. It will be appreciated Virtual Reality may operate both as an information display of operation of the computer system, and also provide 2D and 3D input mechanisms, e.g., through movement of wands or other devices the virtual reality system monitors, as well as by visual monitoring and analysis of use movement, such as gesturing. The input and output devices 618-624 may communicate with the computer system over one or more communication pathways 626 that may interconnect these devices with the computer system. The computer system may be remotely controlled and not require direct user access.

The computer system 602 may implement the techniques described herein using device-specific hard-wired logic, one or more ASICs or FPGAs, firmware and/or program logic which in combination with the computer system causes or programs the computer system to be a special-purpose machine. As circuit technology continues to advance it is contemplated that disclosed embodiments may be presented with advancing technology. For example, quantum-state readout and measurement circuits for qubits, used in quantum computation devices, may be used to encode the processing and/or data storage aspects of disclosed embodiments. According to one embodiment, the techniques herein are performed by the computer system in response to the processor(s) 606 executing one or more sequences of one or more instructions contained in the memory 612. Such instructions may be read into the memory from another storage medium, such as from the storage device(s) 616. Execution of the sequences of instructions contained in the memory causes the processor(s) to perform the process steps described herein. In alternative embodiments, hard-wired circuitry may be used in place of or in combination with software instructions.

Storage media refers to any at least partially non-transitory media that may store data and/or instructions that cause a machine to operation in a specific fashion. Non-volatile media includes, for example, solid state disks (SSDs), optical or magnetic disks, etc. and may be used at the storage device(s) 616. Volatile media includes dynamic memory, such as the memory 612. There are many known volatile and/or non-volatile media memory and media formats that may be used to provide temporary or permanent storage. Storage media may be used in conjunction with transmission media. Transmission media participates in transferring information between storage media. For example, transmission media includes wireless and wired mediums, including the bus 604, modulated signals, acoustic waves, or light waves, such as those generated during radio-wave and infra-red data communications. It will be appreciated data may be optically encoded (e.g., represented as light packets), to encode instructions, data, and/or operational state of the computing system.

Various forms of media may be involved in carrying one or more sequences of one or more instructions to the processor(s) 606 for execution. For example, the instructions may initially be carried on storage of a remote computer. Assuming a similar configuration as the computer system 602, the remote computer can load the instructions into its memory and send the instructions over a communication pathway, which may be any form of wired or wireless communication medium. A corresponding receiving device local to the computer system may receive the data and convert the received information for placement on the bus 604. The bus may then carry the data to the memory 612, from which the processor(s) retrieves and executes the instructions. The instructions may be stored on the storage device(s) 616 before or after execution by the processor(s).

The computer system 602 includes a communication interface(s) 628 coupled to the bus 604. The communication interface(s) provides a two-way data communication coupling to a network 630 that is connected to a local network(s) 632. The communication interface(s) may include devices to communicate over a network such as by way of a local area network (LAN) or other network to provide a data communication connection for the computer system. Wireless links may be utilized. The communication interface(s) sends and receives signals in a format appropriate to the communication medium (e.g., electrical, electromagnetic, optical, etc.) that carry digital data streams representing various types of information. The communication interface(s) 628 allow a computer system to send and/or receive information through one or more network(s) to other data devices. For example, there may be a network link through the local network(s) to a host computer 634. There may be a link 636 that interconnects the local network(s) with the Internet 638, through which the computer system may communicate with another machine, such as one or more remote server(s) 640 which may send or receive requests to process data, retrieve and/or store information, etc.

In addition, various embodiments may employ Artificial Intelligence (AI) Engines (or "machine intelligence") to assist with operating, e.g., the management tool, devices being managed by the management tool, or other devices/machines as desired. It will be appreciated there are many different AI Engines that may be employed, such as neural networks (feedforward, recurrent, backpropagation, deep learning, etc.), expert systems, and many other analytical systems. It will be appreciated an AI Engine 640 may be incorporated into the computer system 602. However, since a robust AI Engine may require robust resources unavailable to certain computers, and AI Engine 642 may be available over a local network(s) 632 and/or an AI Engine 644 may be available as a remote resource accessible over, for example, the Internet 638. It will be appreciated one or more of the AI Engines 640-644 may cooperatively operate to analyze problems and suggest answers.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to remediate a communication using one or more network, from a source through an intermediary to a destination, the one or more network communicatively coupled with a data exchange service providing a messaging system, the method comprising:
   negotiating a negotiated security level for the communication using the one or more network, the negotiating including monitoring a handshake between the source and the destination;
   determining an origin for a request during the handshake for the communication at a preferred security level;
   evaluating whether the negotiated security level is below a threshold;
   capturing, based at least in part on the evaluating the threshold, at least a portion of data passing between the source and the destination;
   determining characteristics of the communication based at least in part on the capturing;
   sending a message identifying at least the characteristics by the messaging system provided by the data exchange service; and
   performing a threat assessment for the communication based at least in part on the source, the destination, the origin, and the characteristics.

2. The method of claim 1, in which the negotiated security level failing the threshold, the method further comprising:
   configuring the destination to communicate at the preferred security level satisfying the threshold; and
   switching, based at least in part on the origin, from the preferred security level to the negotiated security level.

3. The method of claim 1, in which a cloud service hosts the destination and the cloud service provides a detector service, the method further comprising:
   instructing the intermediary to perform the capturing;
   enabling the detector service to receive the characteristics of the communication; and
   receiving an analysis of the communication from the detector service indicating at least an origin of the negotiated security level below the threshold;
   wherein the sending the message by the messaging system operates independently of the negotiating the negotiated security level for the communication.

4. The method of claim 1, in which one or more clients, including the source, communicate with one or more servers, including the destination, through one or more firewalls, including the intermediary, the method further comprising:
   selecting the intermediary from among the one or more firewalls; instructing the intermediary to perform the capturing the at least a portion of data passing between the source and the destination; and
   instructing the intermediary to block the communication between the source and the destination based at least in part on the threat assessment.

5. The method of claim 4, in which a detector service is configured to execute a program to direct the detector service to:
   perform the threat assessment; and
   monitor the handshake between the source and the destination to at least identify the origin for the request for, communication at the preferred security level, the handshake establishing the negotiated security level below the threshold.

6. The method of claim 5, further comprising:
   determining the origin is the source; and
   instructing the intermediary to block at least communication from the source using the negotiated security level failing the threshold.

7. The method of claim 1, in which a firewall including the intermediary is communicatively coupled over the one or more network with a communication server including the data exchange service providing the messaging system, the method further comprising:
   including the characteristics in the message;
   sending the message to the communication server; and
   storing the characteristics of the communication with a cloud service, wherein the cloud service is to run a detector service to access the firewall and direct the firewall to perform the capturing the portion of data.

8. The method of claim 1, in which multiple destinations share a network address with the destination and the negotiated security level being below the threshold, the method further comprising:
   analyzing the portion of data to identify a server name provided by the source to identify the destination for the communication, wherein the destination is configured to respond with an identity certificate corresponding to the server name;
   identifying the origin for the request for the negotiated security level below the threshold; and
   including, in the characteristics, at least the server name and the origin.

9. The method of claim 8, the method further comprising:
   capturing the portion of data with the intermediary;
   if the origin for the request is the source: configuring the intermediary to block a further communication from the source, and including an indicator of blocking the further communication in the characteristics; and
   if the origin for the request is the destination: flagging the communication for review.

10. A system to remediate a communication using one or more network, from a source through an intermediary to a destination, the one or more network also communicatively coupled with a data exchange service providing a messaging system, comprising: a processor; and memory coupled to the processor and storing instructions that, when executed by the processor, cause the system to:
  negotiate a negotiated security level for the communication using the one or more network, the negotiate to include to monitor a handshake between the source and the destination;
  determine an origin for a request during the handshake for the communication at a preferred security level;
  evaluate whether the negotiated security level is below a threshold;
  capture, based at least in part on the evaluating the threshold, at least a portion of data passing between the source and the destination;
  determine characteristics of the communication based at least in part on the capturing;
  send a message to identify at least the characteristics by the messaging system provided by the data exchange service; and
  perform a threat assessment for the communication based at least in part on the source, the destination, the origin, and the characteristics.

11. The system of claim 10, the instructions including further instructions to cause the system to:
  configure the destination to communicate at the preferred security level satisfying the threshold; and
  switch, based at least in part on the origin, from the preferred security level to the negotiated security level, the negotiated security level failing the threshold.

12. The system of claim 10, in which a cloud service hosts the destination and the cloud service provides a detector service, the instructions including further instructions to cause the system to:
  instruct the intermediary to perform the capturing;
  enable the detector service to receive the characteristics of the communication; and
  receive an analysis of the communication from the detector service indicating at least an origin of the negotiated security level below the threshold;
  wherein the sending the message by the messaging system operates independently of the negotiating the negotiated security level for the communication.

13. The system of claim 10, in which the intermediary is a firewall, and the destination has associated therewith a detector service to perform the threat assessment, the instructions including further instructions to cause the system to:
  select the intermediary from a plurality of firewalls associated with the destination;
  enable the intermediary to capture the portion of data passing between the source and the destination;
  instruct the intermediary to block the communication between the source and the destination based at least in part on the threat assessment;
  monitor the handshake between the source and the destination to at least identify the origin for the request for, communication at the preferred security level, the handshake establishing the negotiated security level failing the threshold; and
  instruct the intermediary to block, at least temporarily, selected communication from the origin.

14. The system of claim 10, in which a firewall including the intermediary is communicatively coupled over the one or more network with a communication server including the data exchange service providing the messaging system, the instructions including further instructions to cause the system to:
  send the message to the communication server, the message to include the characteristics;
  store the characteristics of the communication with a cloud service; and
  instruct the cloud service to run a detector service to access the intermediary and direct the intermediary to perform the capturing the portion of data.

15. The system of claim 10, in which a server name for the destination is included in the negotiating, the instructions including further instructions to cause the system to:
  analyze the portion of data to identify the server name;
  identify the origin of the negotiated security level below the threshold, and if the origin for the request is the destination, flagging the communication for review; and
  include within the characteristics at least the server name and the origin.

16. A non-transitory computer readable medium having instructions stored thereon to remediate a communication using a network, from a source through an intermediary to a destination, the network communicatively coupled with a data exchange service providing a chat-based messaging system, the instructions that, in response to execution by a processor, are operable to:
  negotiate a negotiated security level for the communication using the network, the negotiation to include to monitor a handshake between the source and the destination;
  determine an origin for a request during the handshake for the communication at a preferred security level;
  evaluate whether the negotiated security level is below a threshold;
  capture, based at least in part on the evaluate the threshold, at least a portion of data passing between the source and the destination;
  determine characteristics of the communication based at least in part on the capturing;
  send a message to identify at least the characteristics by the chat-based messaging system; and
  perform a threat assessment for the communication based at least in part on the source, the destination, the origin, and the characteristics.

17. The medium of claim 16, the instructions including further instructions that, in response to execution by a processor, are operable to:
  configure an endpoint to the communication to establish the communication at the preferred security level, the preferred security level satisfying the threshold; and
  switch, based at least in part on the origin, from the preferred security level to the negotiated security level, the negotiated security level failing the threshold.

18. The medium of claim 17, in which a cloud service hosts the destination and the cloud service provides a detector service, the instructions including further instructions that, in response to execution by a processor, are operable to:
  instruct the intermediary to perform the capturing;
  enable the detector service to receive the characteristics of the communication from the detector service; and
  receive an analysis of the communication indicating at least an-origin of the negotiated security level below the threshold;
  wherein the sending the message by the messaging system operates independently of the negotiating the negotiated security level for the communication.

19. The medium of claim 16, in which the intermediary is a firewall, and the destination has associated therewith a detector service to perform the threat assessment, the instructions including further instructions that, in response to execution by a processor, are operable to:

select the intermediary from a plurality of firewalls associated with the destination;

enable the intermediary to capture the portion of data passing between the source and the destination;

instruct the intermediary to block the communication between the source and the destination based at least in part on the threat assessment;

monitor the handshake between the source and the destination, the handshake at least partially configured for communication at the preferred security level, and the handshake establishing the negotiated security level failing the threshold;

instruct the intermediary to provide the portion of data to the detector service;

receive from the detector service an indicator of the origin for the handshake establishing the negotiated security level;

determine the origin is the source; and instruct the intermediary to block, at least temporarily, selected communication from a responsible entity.

20. The medium of claim 16, in which a first server name for the destination is identified in the negotiation with the destination, the instructions including further instructions that, in response to execution by a processor, are operable to:

analyze the portion of data to identify the first server name, and to identify a second server name corresponding to the source;

identify the origin of the negotiated security level below the threshold, and if the origin for the request is the destination, flagging the communication for review; and include within the characteristics at least the first server name, the second server name, and the origin.

* * * * *